(12) United States Patent
Hung et al.

(10) Patent No.: US 8,116,073 B2
(45) Date of Patent: Feb. 14, 2012

(54) DISPLAY STRUCTURE OF SLIP-COVER-HINGE ELECTRONIC DEVICE

(75) Inventors: Cheng-Shen Hung, Taipei (TW); Wang-Tsai Lee, Banciao (TW)

(73) Assignee: Amtek System Co., Ltd. (TW)

( * ) Notice: Subject to any disclaimer, the term of this patent is extended or adjusted under 35 U.S.C. 154(b) by 199 days.

(21) Appl. No.: 12/693,674

(22) Filed: Jan. 26, 2010

(65) Prior Publication Data
US 2011/0182019 A1    Jul. 28, 2011

(51) Int. Cl.
*G06F 1/16* (2006.01)
(52) U.S. Cl. ............... 361/679.28; 381/361; 715/810; 345/213
(58) Field of Classification Search .......... 361/752, 361/679.55, 679.58, 679.02, 679.21, 679.47, 361/807, 679.32, 829, 679.56; 381/365, 381/361; 715/771, 750, 818, 810, 700; 345/175, 345/156, 619, 173, 213
See application file for complete search history.

(56) References Cited

U.S. PATENT DOCUMENTS

| | | | | |
|---|---|---|---|---|
| 7,514,403 | B2 * | 4/2009 | Rubroder et al. | 514/1.1 |
| 2008/0062663 | A1 * | 3/2008 | Tsuo | 361/752 |
| 2009/0245565 | A1 * | 10/2009 | Mittleman et al. | 381/365 |

* cited by examiner

*Primary Examiner* — Hung Duong
(74) *Attorney, Agent, or Firm* — Cantor Colburn LLP

(57) ABSTRACT

A display structure of a slip-cover-hinge electronic device, which includes a housing, a display module, two track modules and a flexible-printed-circuit module, is disclosed. The housing has an accommodated cavity formed with a bottom wall, two parallel slots formed respectively at two opposite ends of the bottom wall, and a passageway formed between the two slots and on the bottom wall. The display module is connected within the cavity. Each track module has a track disposed on the opposite ends of the bottom wall and a skid slidably arranged onto the corresponding tracks for gliding in corresponding slots. The flexible-printed-circuit module has at least a flexible-printed-circuit member, which includes an electrical connection portion and a resilient portion flexibly extending from the electrical connection portion. The resilient portion extends out of the passageway of the housing, and the resilient portion is partially self-overlapped to be capable of stretching outwardly.

7 Claims, 6 Drawing Sheets

DISPLAY STRUCTURE OF SLIP-COVER-HINGE ELECTRONIC DEVICE

BACKGROUND OF THE INVENTION

1. Field of the Invention

The present invention relates to a slip-cover-hinge electronic device, in particular, to a display structure of a slip-cover-hinge electronic device.

2. Description of Related Art

Nowadays, the electronic devices usually are designed with a flip lid, such as notebooks and mobiles, or in another way, to be designed with a slide lid, which is usually adapted to mobiles. For recently years, there are slip-cover-hinge electronic devices in the market, such as smart mobiles or tablet PCs. The screen of the slip-cover-hinge electronic device could slide to a predetermined position, which is relative to a base of the electronic device, in order to turn over with a predetermined view angle for the user. When closing the screen is required, the screen would be turned to parallel with the base for further gliding over the base.

A conventional slide hinge structure includes two sliding rails disposed on two lateral sides of a fix plate. A slide plate includes two strips arranged on two lateral sides thereof. The fix plate is secured to the base of the electronic device; the slide plate is secured to a slip cover of the electronic device. By the adaption of the strips and the sliding rails, the slide plate is arranged and is able to glide into the sliding rails of the fix plate.

However, this conventional design of the fix plate and the slide plate suits small electronic devices, for example, smart mobiles, but has some size's issues to large electronic device, like tablet PCs. For PCs, the sizes of the fix plate and the slide plate should increase to meet the whole device, but to be followed by high-costs trouble. Besides, the tolerance of the flexible printed circuit would be taken into consideration which is about turning the screen over. If the design tolerance is improper, the flexible printed circuit of the electronic devices may go to be broken. Therefore, for the screen of the slip-cover-hinge electronic device, it should present not only low cost design, but also possess damage-proof function.

SUMMARY OF THE INVENTION

In view of the aforementioned issues, the present invention provides a display structure of a slip-cover-hinge electronic device, to present high adaptability, simple structure and low cost design, further to shrink occupation vacancy for compact light purpose, and furthermore to possess damage-proof function.

To achieve the above-mentioned objectives, the present invention provides a display structure of a slip-cover-hinge electronic device, which includes a housing, a display module, two track modules and a flexible-printed-circuit module.

The housing has an accommodated cavity formed with a bottom wall, two parallel slots formed respectively at two opposite ends of the bottom wall of the housing, and a passageway formed between the two slots and on the bottom wall. The display module is connected within the cavity of the housing. Each track module has a track and a skid, wherein each track is disposed on the opposite ends of the bottom wall of the housing, each skid slides onto the corresponding tracks for gliding in corresponding slots. The flexible-printed-circuit module is arranged in the accommodated cavity of the housing and having at least a flexible-printed-circuit member. The flexible-printed-circuit member includes an electrical connection portion and a resilient portion flexibly extending from the electrical connection portion. The resilient portion reaches out of the passageway of the housing, and the resilient portion is partially self-overlapped to be capable of stretching outwardly.

To achieve the above-mentioned objectives, the present invention further provides a modesty sheet and a lid sheet. The modesty sheet is disposed on the bottom wall of the housing and corresponding to the passageway for covering, the lid sheet is overlapped with the modest sheet, and the resilient portion of the flexible-printed-circuit member abuts against the modesty sheet in order to position where the resilient portion self-overlapped.

The advantage resulted from the present invention is to possess high adaptability due to the track module, which includes the track and the skid arranged at two sides of the housing. In particular, it is properly applied to the large-sized electronic device, such as a tablet PC, so as to decrease the material costs. Furthermore, the track module is compact designed in order to occupy little space for meeting the requirements of light and thin of electronic devices.

Besides, the resilient portion of the flexible-printed-circuit member, which is capable of extending out via the passageway of the housing, partially self-overlaps, in order to avoid the damage of the flexible-printed-circuit member. In addition, the design with the modesty sheet and the lid sheet is to strengthen the protection to the flexible-printed-circuit member.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
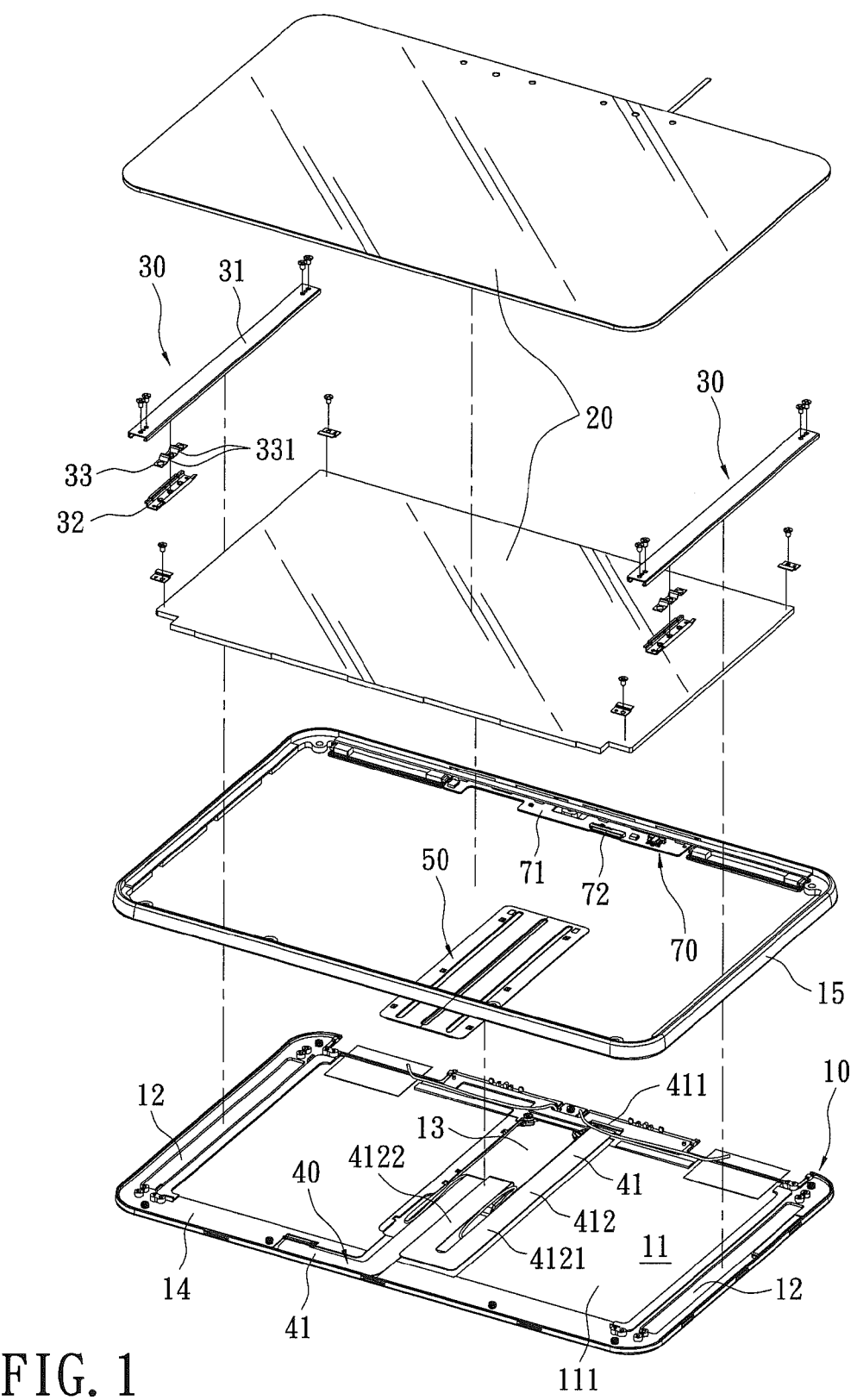
FIG. 1 is an explosive view of a display structure of a slip-cover-hinge electronic device according to the present invention.
Figure 2:
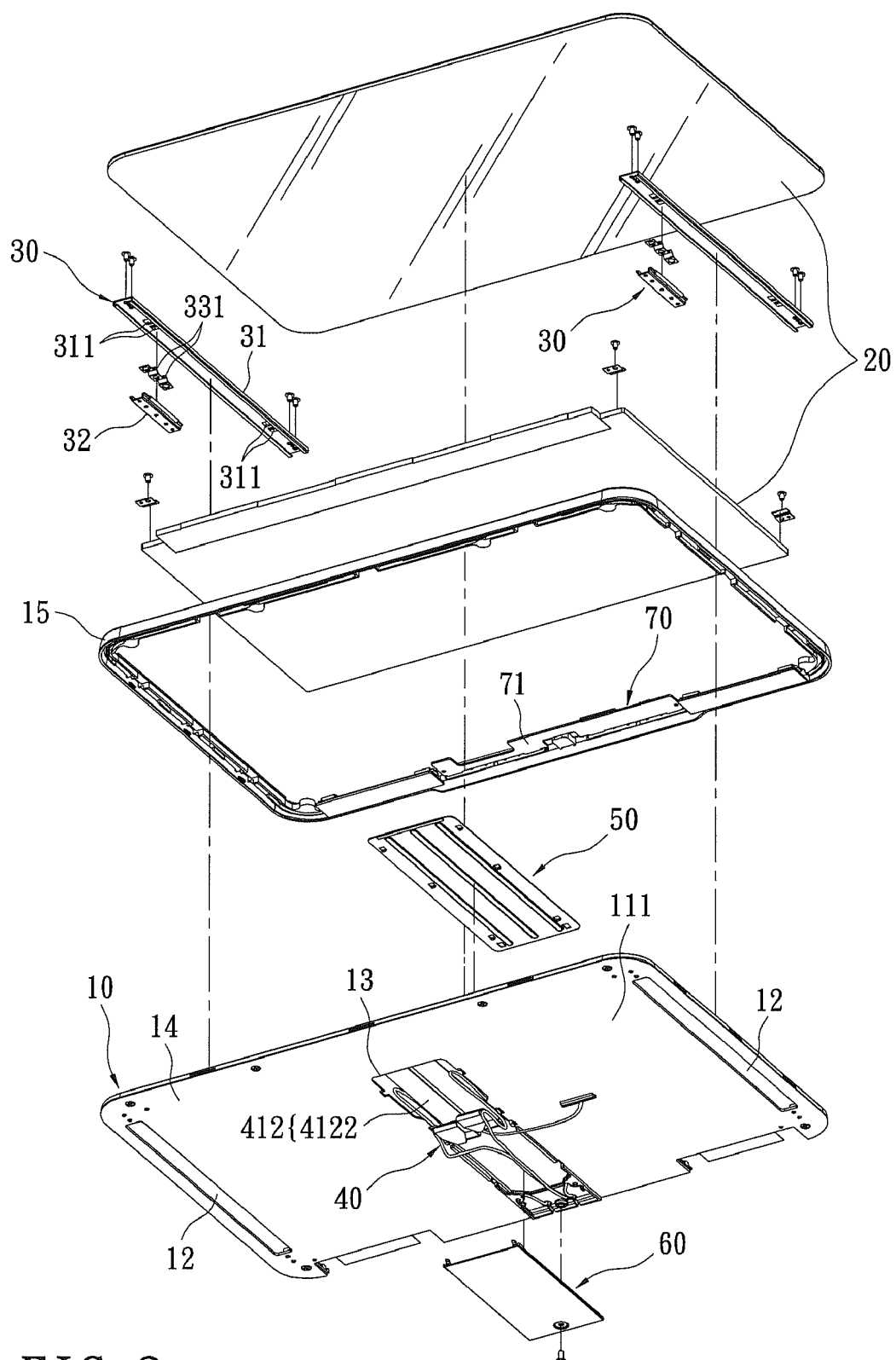
FIG. 2 is an explosive view on another angle.

Referring now to FIGS. 1 and 2, in which an explosive view of display structure of a slip-cover-hinge electronic device according to the present invention is shown. The display structure includes a housing 10, a display module 20, two track modules 30 and a flexible-printed-circuit module 40.

The housing 10 has a accommodated cavity 11 formed with a bottom wall 111, two parallel slots 12 formed respectively at two opposite ends of the bottom wall 111 of the housing 10, and a passageway 13 formed between the two slots 12 and on the bottom wall 11. Preferably, the passageway 13 is arranged at a middle portion of the bottom wall 111 of the housing 10. In addition, the housing 10 includes a base 14 and a frame 15 disposed on the base 14. Both of the base 14 and the frame 15 set with the bottom wall 111 construct the accommodated cavity 11; the slots 12 and the passageway 13 are arranged on the base 14.

The display module 20, which could be a touch panel, is connected within the cavity of the housing 10. The display structure is a tablet PC, which allows the display module 20 to be either the touch panel or ordinary display.

Each track module 30 has a track 31 and a skid 32, and further a lining 33. Each track 31 is disposed on the opposite ends of the bottom wall 111 of the housing 10. Each track 31 includes two orientation protrusions 311 respectively disposed at two end portions thereof; each lining 33 is folded with two flip portions 331.

The flexible-printed-circuit module 40 is arranged in the accommodated cavity 11 of the housing 10 and has at least a flexible-printed-circuit member 41. According to the preferable embodiment, there are two flexible-printed-circuit members 41 applied thereto. Each flexible-printed-circuit member 41, which could be a flexible printed circuit board, includes an electrical connection portion 411 and a resilient portion 412 flexibly extending from the electrical connection portion 411. Each resilient portion 412 includes a link section 4121 bounded to the electrical connection portion 411, and an exterior section 4122 folded and extended from an end of the link section 4121.

In addition, the display structure includes a modesty sheet 50, a lid sheet 60, and a circuit module 70. The circuit module 70 includes a circuit board 71 and a cutting edge 72 arranged on the circuit board 71.

Figure 3:
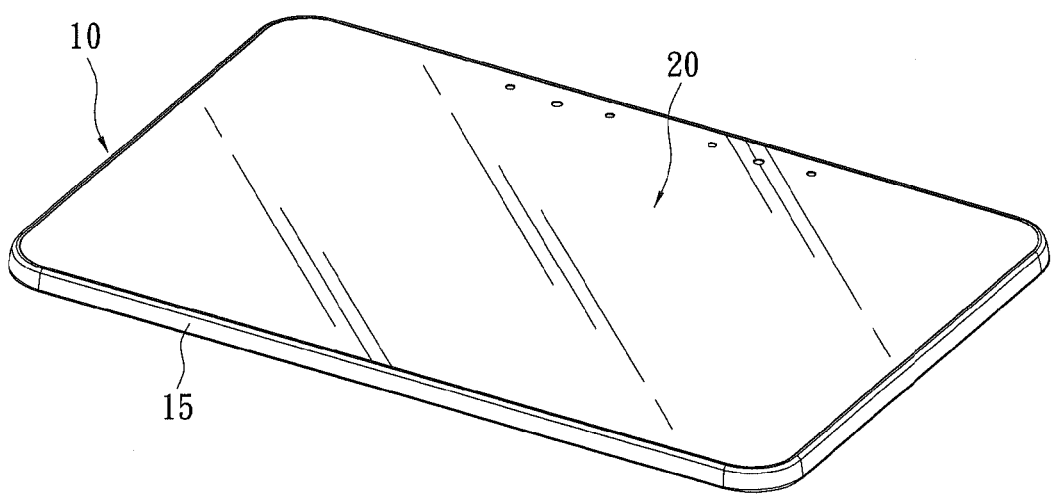
FIG. 3 is an explosive view according to the present invention.
Figure 4:
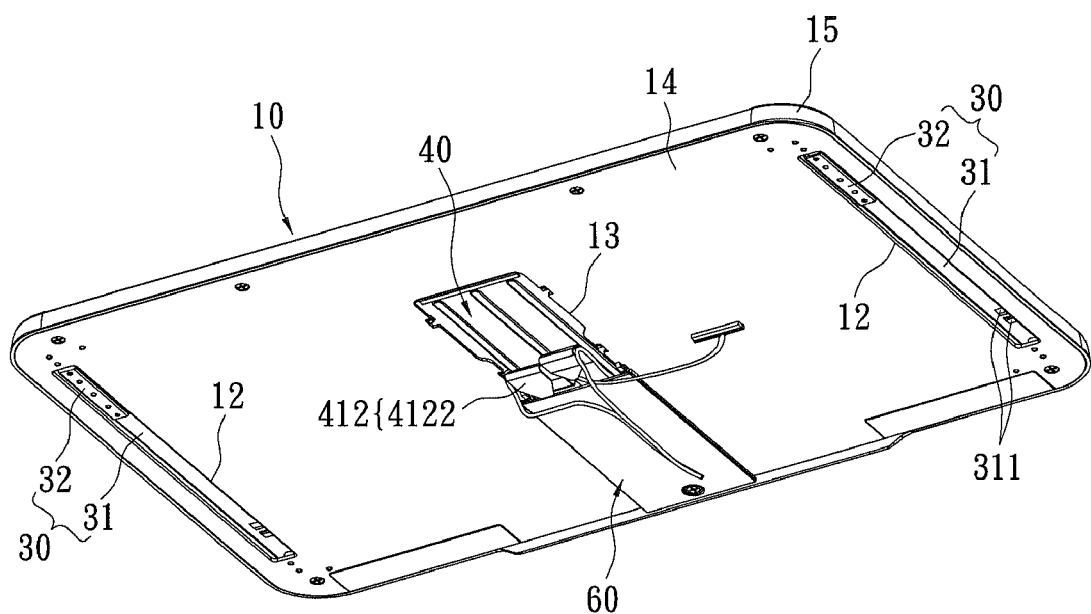
FIG. 4 is an explosive view on another angle.

Further referring FIGS. 3 and 4, each track 31 is secured to the bottom wall 111 of the housing 10. Each skid 32 corresponds to the respective slots 12 and slides onto the corresponding tracks 31 for gliding in slots 12 of the housing 10. The lining 33 is fixed to the corresponding skid 32 and arranged between the track 31 and the skid 32, so that each flip portion 331 of the lining portion 33 engages with the corresponding orientation protrusion 311 of the track 31 for positioning the skid 32 while the skid 32 glides to a respective one end portion of the track 31.

The circuit module 70 is secured in the accommodated cavity 11 of the housing 10, especially secured to a lateral side of the housing 10.

The flexible-printed-circuit module 40 is arranged in the accommodated cavity 11 as well. The resilient portion 412 is long enough to partially self-overlap, which is with an end portion reaches out of the passageway of the housing, and the resilient portion is partially self-overlapped to be capable of stretching out of the passageway 13.

In another respect, the modest sheet 50 is disposed on the bottom wall 111 of the housing 11 and corresponds to the passageway 13 for covering. The lid sheet 60 is arranged on an external wall of the housing 10 and corresponds to the modest sheet 50. The lid sheet 60 overlaps with the modest sheet 50. The resilient portion 412 of the flexible-printed-circuit member 41 abuts against the modesty sheet 50 in order to position where the resilient portion self-overlapped; for detail description, the exterior section 422 abuts against the modesty sheet 50.

The display module 20 is arranged in the accommodated cavity 11. The flexible-printed-circuit module 40 and the track module 30 are below the display module 20. The electrical connection portion 411 of a respective flexible printed circuit member 41 of flexible-printed-circuit module 40 plugs with the cutting edge 72 of the circuit module 70.

Figure 5:
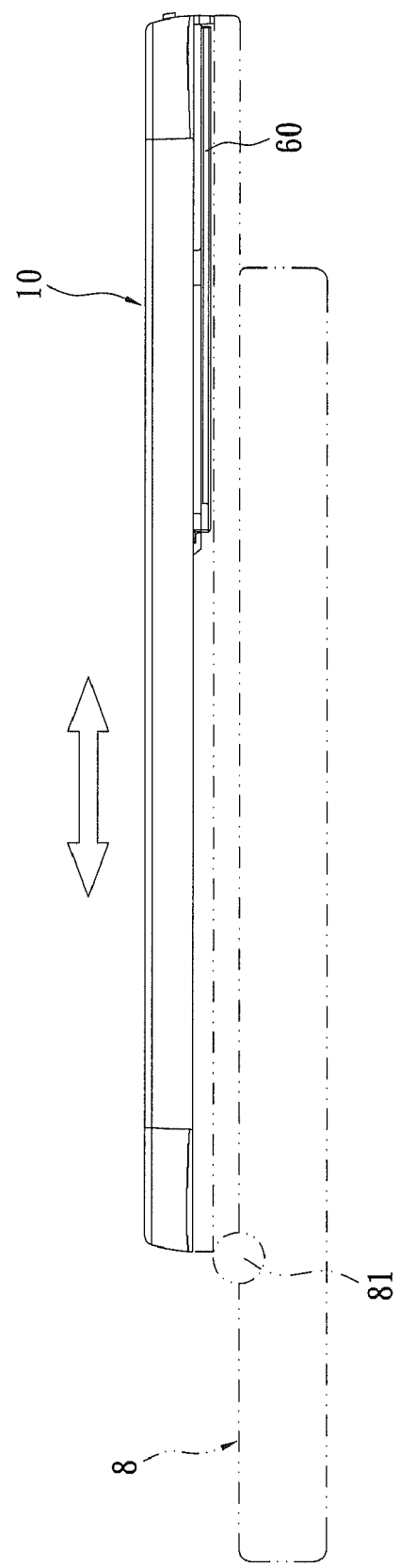
FIG. 5 is a side view illustrating a display gliding while the present invention is applied to a base.
Figure 6:
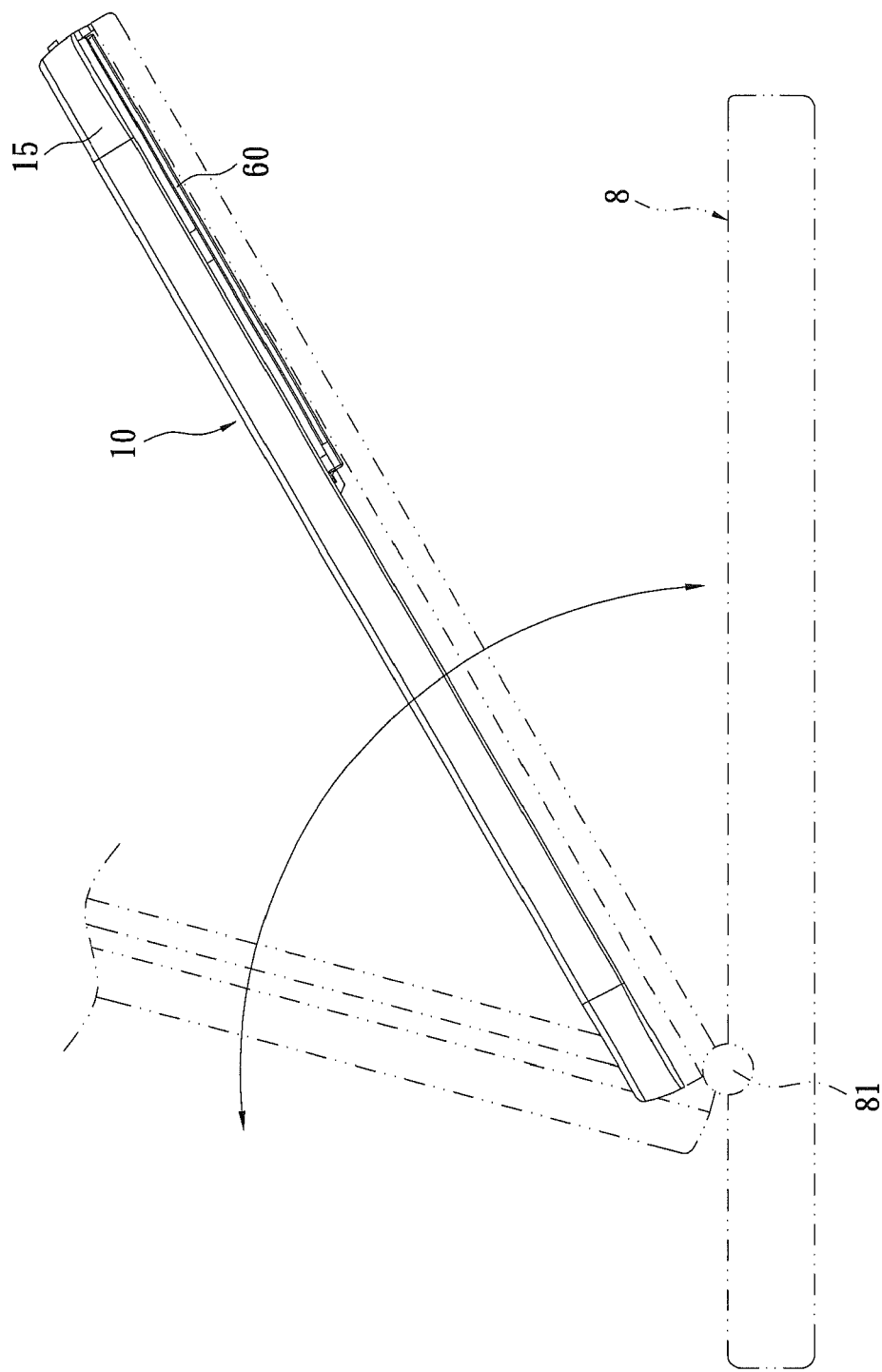
FIG. 6 is side view illustrating a display turning while the present invention is applied to the base.

Further referring FIGS. 5 and 6; the display structure is connected to a base structure 8 so as to construct the slip-cover-hinge electronic device. The base structure 8 includes two track units (not shown) corresponding to the skids 32 of the track module 30 so that the display structure could be capable of sliding. The base structure 8 further includes a hinge 81 to link the display structure. Therefore, the display structure could turn over within proper view angles for users. During the display structure glides outwardly, where the resilient portion 412 overlapped would be carried to stretch. While the display structure back to the original position, the resilient portion 412 would overlap again. In addition, the lid sheet 60 is further connected with two telescopic-linked covers (not shown), which are carried to move for protecting the resilient portion 412 while the display structure glides outwardly.

In summary, through the track module 30 providing the track 31 and the skid 32 within the housing 10, it possesses high adaptability with simple structure, and further performs well in conjunction with large-sized electronic devices, such as tablet PCs. Thereby it reduces the material costs and size of the track module 30, and further occupies little space to improve the compact size of the electronic devices.

Besides, the resilient portion of the flexible-printed-circuit member, which is capable of extending out via the passageway of the housing, partially self-overlaps, in order to avoid the damage of the flexible-printed-circuit member. In addition, the design with the modesty sheet and the lid sheet is to strengthen the protection to the flexible-printed-circuit member.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A display structure of a slip-cover-hinge electronic device, comprising:
    a housing having a accommodated cavity formed with a bottom wall, two parallel slots formed respectively at two opposite ends of the bottom wall of the housing, and a passageway formed between the two slots and on the bottom wall;
    a display module connected within the cavity of the housing;
    two track modules each having a track and a skid, wherein the tracks are disposed on the opposite ends of the bottom wall of the housing and aligned to the two parallel slots, respectively, the skids slidably arranged onto the corresponding tracks for gliding in corresponding slots; and
    a flexible-printed-circuit module being arranged in the accommodated cavity of the housing and having at least a flexible-printed-circuit member; wherein the flexible-printed-circuit member includes an electrical connection portion and a resilient portion flexibly extending from the electrical connection portion; wherein the resilient portion extends out of the passageway of the housing, and the resilient portion is partially self-overlapped to be capable of stretching outwardly.

2. The display structure according to claim 1, wherein the passageway is arranged at a middle portion of the bottom wall of the housing.

3. The display structure according to claim 1, wherein the housing includes a base and a frame disposed on the base; both of the base and the frame set with the bottom wall to construct the accommodated cavity; the slots and the passageway are arranged on the base.

4. The display structure according to claim 1, wherein the display module is a touch panel of a tablet PC.

5. The display structure according to claim 1, further comprising a modesty sheet and a lid sheet; wherein the modesty sheet is disposed on the bottom wall of the housing and corresponding to the passageway for covering, the lid sheet is overlapped with the modest sheet, and the resilient portion of the flexible-printed-circuit member abuts against the modesty sheet in order to position where the resilient portion self-overlapped.

6. The display structure according to claim 1, wherein each of the track modules includes a lining fixed to the corresponding skid and arranged between the track and the skid; each track includes two orientation protrusions respectively disposed at two end portions thereof; each lining is folded with two flip portions; each flip portion engages with the corresponding orientation protrusion for positioning the skid, while the skid glides to a respective one end portion of the track.

7. The display structure according to claim 1, wherein the flexible-printed-circuit member includes a link section bounded to the electrical connection portion, and an exterior section folded and extended from an end of the link section; the exterior section partially self-overlaps to abut against the modesty sheet and to reach out of the passageway.

* * * * *